United States Patent [19]

Drexhage

[11] Patent Number: 4,597,568

[45] Date of Patent: Jul. 1, 1986

[54] ADJUSTABLE TORSION BAR ASSEMBLY

[76] Inventor: Gerrit K. Drexhage, 21 Bernard, Mill Valley, Calif. 94941

[21] Appl. No.: 603,489

[22] Filed: Apr. 24, 1984

[51] Int. Cl.[4] .............................................. F16F 1/14
[52] U.S. Cl. ...................................... 267/154; 5/136; 5/164 R
[58] Field of Search ............... 267/154, 155, 156, 157, 267/57; 5/136, 164 R, 164 B, 2; 16/236, 237

[56] References Cited

U.S. PATENT DOCUMENTS

| | | | |
|---|---|---|---|
| 3,116,494 | 1/1964 | Bennett et al. | 5/136 |
| 3,179,956 | 4/1965 | Bennett | 5/136 |
| 3,490,756 | 1/1970 | Spier | 267/154 |
| 4,318,195 | 3/1982 | Reppas | 5/164 R X |

*Primary Examiner*—Douglas C. Butler
*Attorney, Agent, or Firm*—Thomas S. MacDonald; Alan H. MacPherson; Steven F. Caserza

[57] ABSTRACT

An adjustable torsion bar assembly (10) includes a torsion bar frame (9) having upstanding legs (17, 18) and a structural frame (22) for holding a tip-up bed (11). A pair of torsion rods (20, 21) extend between a frame leg and a structural frame side. A lead screw (31) having threaded portions (32, 33) threaded in opposed helices extends between the structural frame sides which upon rotation moves a pair of pivot plates (35, 36) either inwardly or outwardly in unison. Each pivot plate includes a torsion rod-confining aperture (53, 54) in sliding engagement with a portion of a torsion span of rods as rotation of the lead screw adjusts the movement of the pivot plates along the rods changing the effective span of the torsion rods. The adjusting feature thus allows varying but equal degrees of stored energy in each of the torsion rods when they are twisted resultant from vertical to horizontal movement of the structural frame with respect to the torsion bar frame, the latter of which is fixed with respect to a support floor or wall.

10 Claims, 3 Drawing Figures

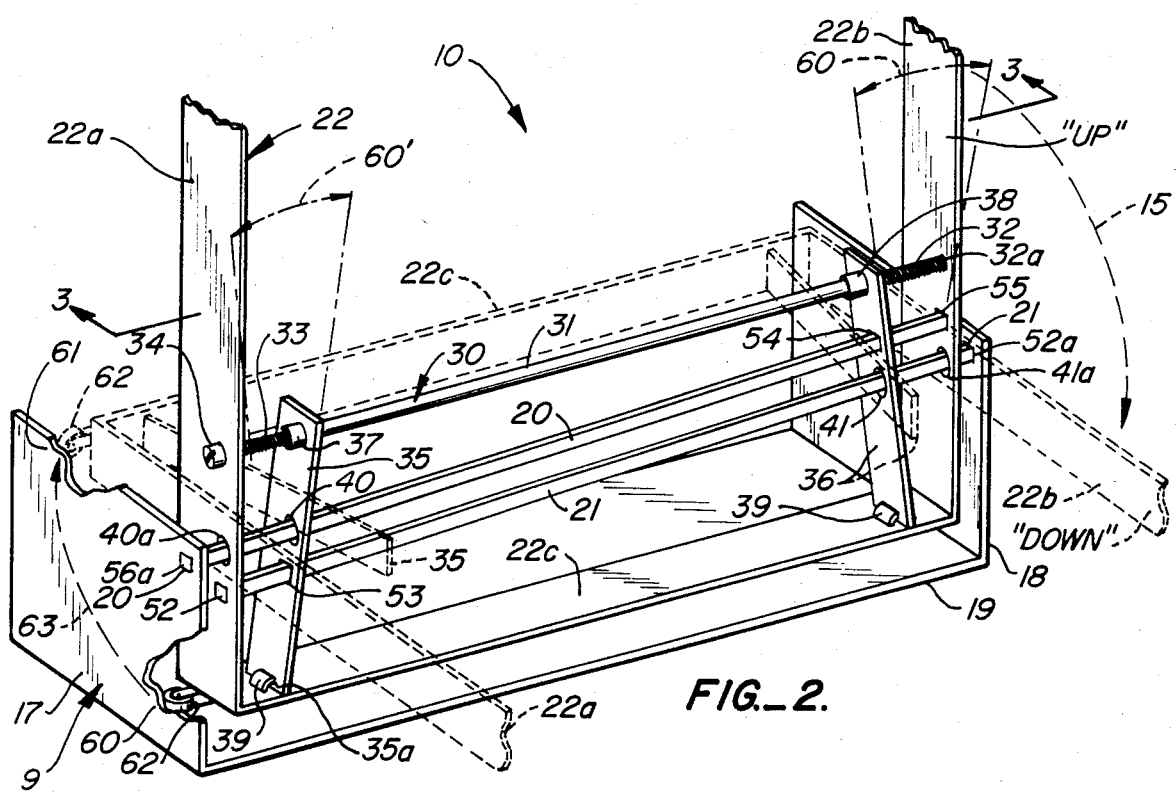
FIG._2.
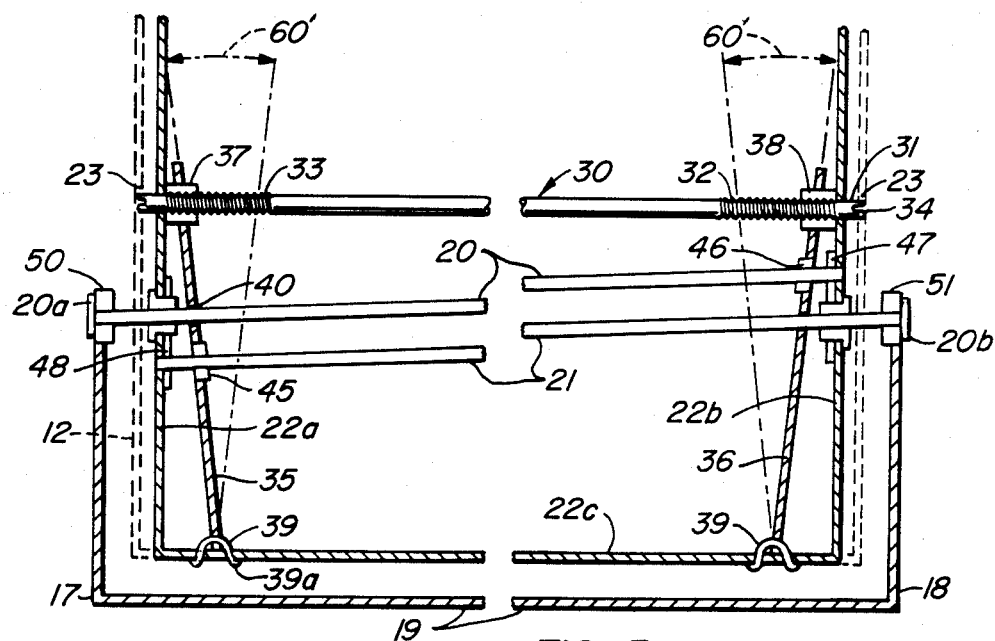
FIG._3.
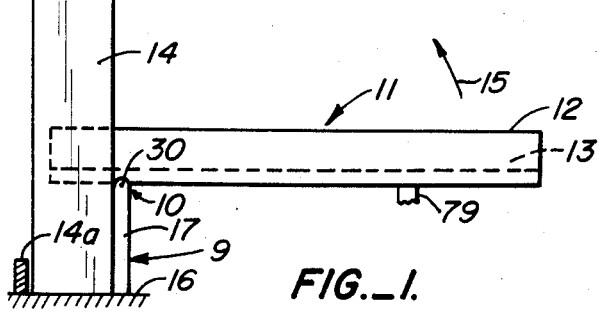
FIG._1.

ADJUSTABLE TORSION BAR ASSEMBLY

CROSS-REFERENCES TO RELATED APPLICATION

This invention may employ those construction shown in and be used with those auxiliary furniture units disclosed in my application Ser. No. 06/603,488, filed Apr. 24, 1984 entitled Variable Height Pivot Connector for Convertible Furniture Units which application is herein incorporated by reference.

BACKGROUND OF THE INVENTION

1. Field of the Invention

This invention relates to an adjustable torsion bar assembly used for pivoting one structure with respect to another. More particularly, it relates to a torsion spring assembly useful in moving a tip-up bed or the like between a horizontal using position and a vertical storage position.

2. Description of the Prior Art

U.S. Pat. No. 3,386,110 shows a tip-up bed pivotable mounted in a wall-type structure. U.S. Pat. No. 4,070,715 shows a combined bed and desk in which the bed frame is pivotable mounted at a rear end to a sidewall base with the bed in a vertical position being at an over center position. U.S. Pat. No. 4,318,195 is directed to a convertible furniture unit-bed and table/desk in which a parallelogram linkage is utilized with the point of pivoting of the bed at an overcenter position. Pivoting is provided (FIG. 5) by a pair of torsion bars variously fixed at opposite ends to the bed frame 12 and wall housing 18. Liftable bed weight in these devices include the frame, pivot attachments, mattress, covers and any connected furniture unit. As these bed elements change in weight the amount of force to raise the bed increases making it most difficult for a user to lift. In some instances it is necessary to provide a motorized lift unit. In any event, in most instances the pivoting mechanism must be custom built to adapt to the particular total weight of the total manufactured bed with its pivoting bed elements. Various manufacturers use different woods of various weights per volume or lumber of various sizes or particular designs in making bed frames or other parts of the furniture unit which contribute to the problem of having various total weights of the unit to be raised and lowered. Such custom building of pivot mechanisms adds much expense to the pivoting mechanism and results in an overall furniture unit of relatively high cost. Thus there has been a need for a low-cost, lightweight pivot assembly which functions satisfactorily, is easy to pull down and lift up by reason of less lift force being required, and is universally adaptable to bed or other constructions which are of varying weight.

SUMMARY

The present invention utilizes means for adjusting the torsion bar assembly of the prior art devices to meet the objections raised with respect to the manufacture and use of such devices. The invention is directed to a universal torsion bar assembly saleable to various manufacturers whose paricular overall structure to be pivoted can be of a considerably varying weight and design. After assembly with the pivoting structure(s) the torsion bars may be adjusted in effective bar length or span. This adjusts the counteracting forces resulting from the twisting of the torsion bars to store torsion energy upon pivoting movement of the overall structure from the vertical position to a horizontal position of that structure. In the case of a tip-up bed unit the torsion bars twist during the 90° pivoting motion between the bed vertical and the bed horizontal positions. The torsion bars in such application are in a neutral untwisted position when the bed is stored vertically with "pull down" downward movement of the bed torsioning the rods to store energy in the horizontal bed position. When the bed is to be raised from the horizontal to vertical position the stored energy in the torsion rods assists in "lifting" the cantilevered weight of the bed.

The adjusting means generally comprises a lead screw extending between sides of a structural frame and a pivot plate having a thread follower threadedly mounted on a threaded end of the lead screw. Turning of the lead screw moves the follower and pivot plate. The pivot plate has an aperture which holds and prevents normal twisting of the torsion bar at that holding point while allowing the plate to slide along the torsion bar to various positions. Such movement lengthens or shortens the effective span between held portions of the torsion bar(s) and thus varies the counteracting torsion force and compensates for variously weighted structures being pivoted. The adjusting operation will normally be a factory-operation to insure that the product being shipped and when properly installed can easily be moved up and down. It may also be adjusted in the non-tensioned bed "up" position by insertion and turning of a coin or screw driver in the slotted head by a user in the event a heavier or lighter mattress replacement is made or if the mechanism otherwise needs adjusting.

Means are also provided to temporarily lock the structural frame and a torsion bar frame at both extremes of travel, or intervening positions of travel, as desired.

The device accommodates a wide range of weight without the use of gas springs. With less than two pounds of lift force a queen-size bed folds away vertically to gain usable space in a room or to reveal a table or sofa effectively converting the room for another use.

BRIEF DESCRIPTION OF THE DRAWINGS

FIG. 1 is a side elevational view of a tip-up bed unit utilizing the invention shown in bed "down" position.

FIG. 2 is a perspective view of the adjustable torsion bar assembly in maximum bar torsion position.

FIG. 3 is a partial cross-sectional front view of the torsion bar taken on the line 3—3 of FIG. 2 in minimum bar torsion position.

DETAILED DESCRIPTION

A particular application for a multi-functional hardware unit including the adjustable torsion bar assembly of this invention is seen in FIG. 1. A torsion bar assembly 10 is utilized as a pivoting axis 30 for a bed assembly 11 which is movable between vertical and horizontal position. The bed assembly 11 comprises a outer bed frame 12 normally of wood construction which confines a mattress 13. Assembly 11 is pivoted on a pair of torsion rods 20, 21 by a torsion bar assembly 10 shown in detail in FIGS. 2 and 3. The torsion bar assembly 10 is held in a torsion bar frame 9 normally securely mounted to a floor structure 16 and confined within a wall mounted housing 14 or wall recess into which the bed 11 is raised on an arc 15 into vertical storage position. An appropriate bed support leg 79 extends from underneath the bed unit. The support 79 may, in cooperation with frame 12, also mount other convertible furniture units as shown in the prior art and be linked by appropriate pivoting means to floor structure 16 as shown in the above related application.

FIG. 2 shows the adjustable torsion bar assembly 10 comprising a U-shaped torsion bar frame 9 having a pair of spaced parallel legs 17 and 18 upstanding from a horizontal bottom plate member 19. The torsion bar frame in the case of a bed application is mounted on the floor 16 or a wall base 14a FIG. 1 of a bedroom or the like. The overall assembly 10 may be shipped as a unit to a convertible bed manufacturer for factory installation. A pivotable structural metal frame 22 is provided interjacent the spaced legs 17 and 18 of torsion bar frame 9. The structural frame 22 comprises a pair of metal plate sides 22a and 22b connected by an end plate 22c. The structural frame is bolted to or otherwise connected to the interior of the frame 12 of the bed and provides a structurally superior interior support for attaching the torsion bars. In many applications the frame sides 12 of the bed are made of wood which does not have sufficient structural strength to support the torsion bar assembly and thus all parts of the torsion bar assembly 10 other than the bronze bushings and the rubber or plastic rollers are preferably made of steel. Suitable apertures are provided in the bed frame 12 so that the hereafter described torsion bars and adjusting means may pass therethrough towards legs 17 and 18 of the torsion bar frame.

Torsion bar 20 extends from one leg 17 of the torsion bar frame to one side 22b of the structural frame and is locked in place so that the torsion bar cannot twist at end points 55 and 56a. The second torsion bar 21 extends from a locked position in upstanding leg 18 to a locked position on structural frame side 22a at point 52 and is therefore locked in place at each of points 52 and 52a. Movement of the structural frame (and attached bed and frame) from an "up" position to a "down" position as shown by arc 15 will normally twist the respective torsion rods 20, 21 between points 55 and 55a and points 52 and 52a thus permitting a balanced distribution of weight across the torsion bar frame and allowing the bed and attached pivotable structure frame to easily move from the "up" position to the "down" position. Upon such vertical to horizontal movement torsion energy is stored in the torsion bars. When it is desired to raise the bed structure back to the "up" position that stored energy assists in moving the relatively heavy weight of the bed and its elements back to the vertical position.

The present invention provides for an adjustment of the effective span between the leg-to-side connections of each of the torsion rods so as to change torsion energy storage capabilities of the torsion rods. The adjusting means 30 comprises a lead screw 31 having threaded portions 32 and 33 at each end thereof which lead screw is rotatable by a slotted screw head 34 or knurled or other turnable head. A pair of lever plates 35 and 36 are pivotably mounted on structural frame plate 22c and include upper thread followers 37, 38 fixed therein which upon rotation of lead screw 31 move traversely of the lead screw threads both to a position inwardly of the frame ends 22a and 22b or outwardly to a position generally parallel to sides 22a and 22b. Each of lever plates 35, 36 includes a first aperture 40, 41 for freely receiving a transverse portion of one of the torsion rods.

The first apertures 40, 41 are of a diameter greater than the maximum cross-sectional dimension of the rectangular preferably square torsion bar 20 thus permitting the respective torsion bars to freely twist and not be restrained within apertures 40, 41. Below the first aperture 40 in lever plate 35 is a rectangular slot 53 which functions as a second aperture means for slidingly and fixedly confining a transverse portion of lever arm 21. Likewise lever plate 36 contains a rectangular second aperture means 54 which is in sliding confining relationship with a portion of torsion bar 21, 20. Thus, at any rotative position of lead screw 31 the lever plates 35 and 36 act in unison to move the apertures 53 and 54 traversely along rods 21 and 20, respectively, so as to shorten or lengthen the distance between point 55a and 54 and points 52a and 53 to vary the length of span between those particular points.

Slots 53, 54 have a higher vertical than horizontal length so that the vertical edges closely confine the vertical edges of the square torsion bars but they can move up and down in the slots to compensate for the moving arc. It is to be understood that the threads 32 and 33 are of opposed helices i.e. a left thread and right thread so that the pivoted plates 35 and 36 move in unison inwardly over arc 60' or outwardly over arc 60' as indicated by the arrows. Thread followers 37, 38 are loosely fitted as by a swivel connection to plates 35, 36 so as to compensate for the arc of travel of plates 35 and 36.

In FIG. 2 plates 35 and 36 are shown in their inwardmost position and thus the span between the aforementioned points are at the minimum distance. More energy is stored in the shorter span when the structural frame 22 and bed assembly is moved to the down position and the torsion bars twist between the above respective points to store the torsion energy.

Torsion plates 35 and 36 are pivoted on end plate 22c by passing a U-shaped link 39 or similar pivot through a slot 35a in each of the pivoted plates 35, 36. As shown in FIG. 3 link 39 may be bent over at ends 39a and held in place on the rear side of end plate 22c of the structural frame 22.

In order to prevent lateral movement of the torsion rods 20 and 21 in their respective held positions in upstanding leg 17 and frame 22b and leg 18 and side 22a, respectively a positive locking means comprising a locking pin 20a laterally extending through a protruding end of the torsion bar and an exterior bracket 20b holding extended ends of the pin is provided. An unthreaded end 32a of lead screw 31 is rotatively mounted and held in structural frame side 22b. The phantom dotted lines show structural frame 22 extending horizontally from the torsion bar frame and the horizontal position of the pivoted plates 35 and 36 in the bed "down" position. Appropriate apertures 40a and 41a are provided in the structural sides 22a and 22b to allow the torsion rods 20 and 21 to pass through the frame sides to their fixed attachment with the torsion bar frame legs 17 and 18.

Roller means 62 extend from an exterior corner edge of the rear portions of frame 22 and ride in a 90° arc on the interior surface of torsion frame leg 17. At the horizontal and vertical positions roller 62 drops into a curved depressions 61, 60, respectively, which positively holds and temporarily locks the bed assembly in the "down" or "up" positions. A slight extra force is necessary in manually releasing the rollers from the locking depressions when the bed assembly is being returned to its former position. Rollers are normally of plastic or rubber construction and ride relatively easily and silently on leg 17.

FIG. 3 shows a front view of the torsion bar assembly in which the legs 17 and 18 and frame sides 22a, 22b and 22c are in cross-section. In this Figure the thread followers 37 and 38 are shown in the maximum "out" position close to sides 22a and 22b such that the second aperture means 45 and 46 in the respective pivoting plates 35 and 36 are also at a maximum closeness to sides 22a and 22b resulting in the maximum span between leg 17 and aperture 46 and leg 18 and aperture 45. In this mode, the effective twist length of each of the torsion rods is at its longest and thus less stored torsion energy is present when the bars are twisted in going from the "up" position to the "down" position as illustrated. The torsion bars may be held in the second apertures in each of the pivoted plates 35 and 36 by self-lubricating bronze sliding bearing inserts mounted in apertures 45 and 46. FIG. 3 shows in dotted lines the bed frame 12 extending between the leg 17 and side 22a and between leg 18 and facing side 22b of the inner structural frame 22. Apertures 23 afford access to the slotted head(s) 34 of screw 31 of the adjusting assembly 30 are also shown.

The above description of the preferred embodiment of this invention is intended to be illustrative and not limiting. Other embodiments of this invention will be obvious to those skilled in the art in view of the above disclosure.

I claim:

1. An adjustable torsion bar assembly for a structure pivotably moveable from a first to a second position comprising:
   a torsion bar frame having a pair of spaced legs upstanding from a base;
   first and second torsion bars;
   a pivotable structural frame having a pair of sides extending inwardly of and parallel to said torsion bar frame upstanding legs;
   one end of each of the torsion bars being fixedly connected to one of said torsion bar frame spaced legs and the other end of each of said torsion bars being fixedly connected to a structural frame side most removed from said one of said legs; and
   means extending between said pair of structural frame sides and in contact with a spaced portion of each of said first and second torsion bars intermediate the ends of said first and second torsion bars for adjusting the effective twist length of both of said torsion bars between a torsion bar frame spaced leg and a structural frame side.

2. The assembly of claim 1 wherein said adjusting means simultaneously adjusts the effective twist length of both said torsion bars.

3. The assembly of claim 1 wherein said adjusting means comprises a lead screw extending between said structural frame sides and a pivoted plate operably connected to said lead screw and a portion of one of said torsion bars.

4. The assembly of claim 3 in which said structural frame includes a plate member traversing said structural sides and said pivoted plate is pivoted to said plate member.

5. The assembly of claim 1 wherein said adjusting means includes a pivoted plat e operably adjustable to move along a length of a torsion bar to shorten or lengthen the effective span between fixedly confined portions of the torsion bar.

6. The assembly of claim 1 in which said structural frame mounts a bed frame and mattress which frame is movable between vertical and horizontal positions with respect to said torsion bar frame.

7. An adjustable torsion bar assembly for a structure pivotably moveable from a first to a second position comprising:
   a torsion bar frame having a pair of spaced upstanding legs;
   first and second torsion bars;
   a pivotable structural frame having a pair of sides extending inwardly of an parallel to said torsion bar frame upstanding legs;
   one end of each of the torsion bars being fixedly connected to one of said torsion bar frame spaced legs and the other end of each of said torsion bars being fixedly connected to a structural frame side most removed from said one of said legs;
   means extending between said pair of structural frame sides for adjusting the effective twist length of both of said torsion bars between a torsion bar frame spaced leg and a structural frame side; and
   wherein said adjusting means comprises a lead screw having oppositely threaded portions at each end and extending parallel to a transverse axis between said torsion bars; and follower in threaded engagement with a screw threaded portion of said lead screw, first aperture means for freely receiving a transverse portion of one of said torsion bars and second aperture means for slidingly and fixedly confining a transverse portion of the other torsion bar from twisting.

8. The assembly of claim 7 in which said torsion bars are square in cross-section and said second aperture means of each of said plates is rectangular having vertical side walls in a sliding fit with one of said torsion bars.

9. The assembly of claim 7 in which said structural frame includes a plate member traversing said structural sides and each of said pivoted plates is pivoted to said plate member at spaced positions adjacent to said structural sides.

10. The assembly of claim 7 in which said first aperture means has a minimum dimension greater than a maximum cross-section dimension of said torsion bars.

* * * * *